(12) United States Patent
Erdmann et al.

(10) Patent No.: US 9,552,937 B2
(45) Date of Patent: Jan. 24, 2017

(54) ELECTRO-MECHANICAL ENERGY HARVESTING SWITCH

(75) Inventors: Bozena Erdmann, Aachen (DE); Bas Willibrord De Wit, Dordrecht (NL); Armand Michel Marie Lelkens, Heerlen (NL); Arthur Robert Van Es, Eindhoven (NL); Ludovicus Marinus Gerardus Maria Tolhuizen, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 279 days.

(21) Appl. No.: 14/239,156

(22) PCT Filed: Aug. 16, 2012

(86) PCT No.: PCT/IB2012/054179
§ 371 (c)(1),
(2), (4) Date: Feb. 17, 2014

(87) PCT Pub. No.: WO2013/027161
PCT Pub. Date: Feb. 28, 2013

(65) Prior Publication Data
US 2014/0191592 A1   Jul. 10, 2014

Related U.S. Application Data

(60) Provisional application No. 61/526,362, filed on Aug. 23, 2011.

(51) Int. Cl.
*H01H 13/50*   (2006.01)
*H02K 7/18*   (2006.01)

(52) U.S. Cl.
CPC ............ *H01H 13/50* (2013.01); *H02K 7/1853* (2013.01); *H02K 7/1892* (2013.01); *H01H 2239/076* (2013.01); *Y10T 307/977* (2015.04)

(58) Field of Classification Search
CPC   H01H 13/50; H01H 2239/076; H02K 7/1853; H02K 7/1892; Y10T 307/977
(Continued)

(56) References Cited

U.S. PATENT DOCUMENTS 7,019,241 B2   3/2006   Grassl et al.

FOREIGN PATENT DOCUMENTS

EP   0656612 A1   11/1994
EP   1607993 A1   12/2005
(Continued)

*Primary Examiner* — Hal Kaplan
(74) *Attorney, Agent, or Firm* — Meenakshy Chakravorty (57) ABSTRACT

An electro-mechanical energy harvesting switch configured to provide at least two different control signals comprises: a generator activating member (9) configured to move between a rest position and a maximum loaded position; at least one spring (11, 13) configured to force the generator activating member towards the rest position; and a unidirectionally rotating protrusion member (17) comprising at least one protrusion (21) configured to move through a protrusion's path during rotation of the protrusion member (17), through a first position of the protrusion (21), in which first position the protrusion (21) is engaged with the generator activating member (9) in the rest position, and through a second position, the protrusion (21) thereby carrying the generator activating member (9) from the rest position to the maximum loaded position against the force of the at least one spring (11, 13).

15 Claims, 7 Drawing Sheets (58) Field of Classification Search
USPC .......................................................... 307/143
See application file for complete search history.

(56) References Cited

FOREIGN PATENT DOCUMENTS

| | | |
|---|---|---|
| FR | 2934708 A1 | 2/2010 |
| WO | 200167580 A2 | 9/2001 |

ELECTRO-MECHANICAL ENERGY HARVESTING SWITCH

FIELD OF THE INVENTION

The invention relates to an electro-mechanical energy harvesting switch configured to provide at least two different control signals, said switch comprising: a generator activating member configured to move between a rest position and a maximum loaded position; and at least one spring configured to force the generator activating member towards the rest position.

BACKGROUND OF THE INVENTION

Wireless sensing and controls provides the freedom of device placement and portability/mobility and reduces the cost of installation (no cable placement or drilling required), if the device does not have to be connected to mains power supply. The state-of-the-art power supply solution for wireless, especially for sensors and simple controls, is battery-operated devices. However, the battery has a limited lifetime leading to risk of failure or requiring replacement at a regular scheme, which is resource demanding. The emerging alternative is self-powered devices, which harvest/scavenge the energy required for operation and communication from their surroundings (e.g. light, temperature, movement—e.g. rotation, vibration, flow- or electro-magnetic radiation) or the interaction with the human user/operator.

Especially in the latter case, the focus on optimizing the technical aspects of the design (mechanics, power harvesting, conversion and storage, integration with the load (radio)) to match the amount of energy harvestable from the user action may lead to sacrificing the usability aspects, such as the functionality offered to the user, intuitiveness of controls and ease-of-use of controls (number and order of steps required, esp. compared to the state-of-the-art mains- or battery-powered analogues).

WO-A-01/67580 discloses an electro-mechanical wireless energy harvesting switch as mentioned by way of introduction. This known switch comprises a generator, which preferably is a rotating generator such as an alternator, and it is configured to provide for at least two different control signals in accordance with the operation by a user. Thus in one embodiment the switch comprises two manual actuator members in the form of rocker buttons for optional activation by the user in accordance with the type of control signal the user wants the switch to provide. In another embodiment it comprises a single manual actuator member in the form of a rocker button provided with more e.g. three contacts upon which the user will selectively apply pressure in order to operate the rocker button in accordance with the type of control signal the user wants to provide. A generator activating mechanism, i.e. a mechanical transmission of energy from the user operated rocker button to the generator comprises in a first embodiment a generator activating member and a spring, the generator activating member being movable in a direction against the load of the spring to store energy and being releasable to transfer stored energy to the generator through a generator coupling. For moving the generator activating member against the load of the spring to store energy the generator activating mechanism further comprises a reciprocating rocker arm rotating around an axis and carrying at a free end a spring loaded hinged engagement member engaging the generator activating member in a rest position thereof to push the generator activating member to a loaded position where the engagement member due to contact with a ramp is disengaged from the generator activating member, which is thereby released to return to the rest position transferring energy stored in the spring to the generator. The reciprocating rocker arm and the spring loaded engagement member entail a rather complicated mechanism. Further the arrangement of the reciprocating rocker arm entails a risk of bias and premature wear.

Other examples of electro-mechanical wireless energy harvesting switches are found in EP-A-0 656 612 disclosing a switch in which the generator is activated directly by the action of a user, and U.S. Pat. No. 7,019,241 and EP-A-1 607 993 both of which relates to switches comprising dead-center mechanisms with two rest positions, said switches activating a generator alternately in either direction whenever the switch passes the dead-center while moving from one rest position to another.

SUMMARY OF THE INVENTION

It is an object of the present invention to overcome above problems of the prior art, and to provide an electro-mechanical energy harvesting switch, which can be produced cost-effectively and provide for versatility of use.

A further object is to provide an electro-mechanical energy harvesting switch that provides for intuitive and convenient operation for a user.

According to a first aspect of the invention, this and other objects are achieved by an electro-mechanical energy harvesting switch, which is comprising: a rotating protrusion member comprising at least one protrusion configured to move through a protrusion's path during rotation of the protrusion member through a first position of the protrusion, in which first position the protrusion is engaged with the generator activating member in the rest position, and through a second position, the protrusion thereby carrying the generator activating member from the rest position to the maximum loaded position against the force of the spring.

By providing a unidirectionally rotating protrusion member that brings the generator activating member from its rest position to its maximum loaded position, which will generally be the position from which the generator activating member is released to return to its rest position, a very simple mechanism is obtained providing for an even load and wear.

It should be understood that the maximum loaded position is the position obtained by the generator activating member during ordinary operation by a user, in which the generator activating member is most heavily loaded by the spring or springs forcing it towards the rest position.

The possibility of providing at least two different control signal provides for versatility of use. In here different embodiments providing for at least two different control signals are presented that can be used alone or in any combination.

In a preferred embodiment the switch is an electro-mechanical wireless energy harvesting switch.

In a preferred embodiment the generator activating member only has a single rest position, which facilitates the provision of a simple mechanism.

In a further preferred embodiment the protrusions path is circular, which facilitates the provision of a simple mechanism.

The switch preferably comprises a generator that may be any device transforming mechanical energy into electric energy, but in a preferred embodiment the generator is a step motor.

The switch preferably also comprises electronics for providing and emitting a control signal when receiving electric energy produced by the generator.

In a preferred embodiment the protrusion member is a toothed wheel carrying evenly spaced teeth constituting a plurality of said protrusions. This embodiment facilitates the provision of a simple mechanism.

In a further preferred embodiment a bias component biasing the protrusion member towards a rest position is provided. Such bias component may facilitate the functionality of the switch. When the protrusion member is configured as a toothed wheel the bias component may in a preferred embodiment comprise a spring and a toothed wheel engaging part.

In a further preferred embodiment the generator activating member comprises a rack portion extending along a path followed by the generator activating member and constituting a part of a generator coupling, and a generator is provided with at least a sector of a gear wheel constituting another part of the generator coupling. This contributes to obtaining a simple mechanism. Preferably said path is rectilinear.

In a further preferred embodiment the switch comprises a sliding member configured move through a slide path between a first and a second position on the slide path, and comprises a transmission between the sliding member and a manual actuator member, whereby the sliding member is moving upon activation of the manual actuator member thereby engaging with and moving the protrusion member to forward the protrusion through the protrusion's path. This embodiment further facilitates the provision of a simple mechanism.

The manual actuator member is in a preferred embodiment configured to move upon manual activation by a user in a direction crosswise to the slide path and the transmission provided between the manual actuator member and the sliding member is transferring a movement of the manual actuator member into a movement of the sliding member along the slide path. This provides for providing the manual activator member as an ordinary push-button to facilitate operation by the user. Hereby the transmission may in a preferred embodiment comprise a wedge shaped protrusion on the manual actuator member configured to move the slide member along the slide path upon activation of said manual actuator member.

In a preferred embodiment the switch comprises a return member, such as a return spring, affecting the sliding member and the manual actuator member. This facilitates the switch's return to an initial position after activation by a user.

A first embodiment providing for at least two different control signals comprises a manually movable control member and a sensor configured to sense the position of said control member. Hereby a user is able to give an indication of an intended result of the operation of the switch by moving the movable control member into a corresponding position. Thus this embodiment provides for versatility combined with intuitive convenient operation.

In a variant of the latter embodiment the control member comprises an endlessly rotatable knob. In another variant the control member comprises a knob movable between two stops. Such knob movable between stops could e.g. be a rotatable knob or a slider. These variants each in their way provides for versatility combined with intuitive convenient operation.

A second preferred embodiment providing for at least two different control signals comprises a first and a second manual actuation member and at least one sensor configured to sense activation of at least one of the first and the second manual actuator member. This embodiment provides for versatility combined with intuitive convenient operation by offering two manual activator members or buttons for the user to activate each button having its intuitive function, and if a sensor is provided for either manual activator member simultaneous activation of the two manual activator members or buttons may provide a separate intuitive function. Preferably the switch further comprises a second sliding member configured move through a second slide path between a first and a second position, upon activation of the second manual actuator member, thereby engaging with and moving the protrusion member to forward the protrusion through the protrusion's path. This facilitates the provision of a simple mechanism.

The skilled person will realize that the first and the second embodiment providing for at least two different control signals may easily be combined in a single switch.

A third preferred embodiment providing for at least two different control signals comprises a release detector for a manual actuator member. This provides for versatility combined with intuitive convenient operation in that a user may activate the manual actuator member and either hold said member for a time while an action takes place or the user may release said member immediately after activation thereby providing for another action.

In a further embodiment the release detector comprises: a second generator activating member configured to move between a second rest position and second loaded positions; and at least one second spring configured to force the second generator activating member towards the second rest position; wherein the two generator activating members are configured to be engaged simultaneously by the protrusion member, the first generator activating member is configured to be disengaged from the protrusion member in a first disengagement position of the protrusion member to be released for return to the rest position, the protrusion member being movable into the first disengagement position by action of the manual actuator member and the second generator activating member being releasable for return to the second rest position on the user's release of the manual activator member. This embodiment facilitates the provision of a simple mechanism.

In a preferred further embodiment the second generator activating member is configured to be disengaged from the protrusion member in a subsequent position of the protrusion member subsequent to the first disengagement position of the protrusion member and reachable by the protrusion member when the manual actuator member is released by the user. This embodiment further facilitates the provision of a simple mechanism.

In a further preferred embodiment the protrusion member comprises a plurality of protrusion and a sliding member, as mentioned above, comprises a first surface part configured to engage a first protrusion for moving the protrusion member in its rotational direction and a second surface part configured to block the protrusion's path for a second protrusion trailing the first protrusion, when the sliding member is in the second position on the slide path, thereby blocking the entry of the protrusion member into the subsequent position. This embodiment further facilitates the provision of a simple mechanism.

The skilled person will realize that this third embodiment providing for at least two different control signals like the first and second embodiment may be implemented alone in a switch according to the invention or it may be implemented together with either or both of the first and the second embodiment providing for at least two different control signals.

It is noted that the invention relates to all possible combinations of features recited in the claims.

BRIEF DESCRIPTION OF THE DRAWINGS

This and other aspects of the present invention will now be described in more detail, with reference to the appended schematic drawings showing embodiment(s) of the invention, wherein.

DETAILED DESCRIPTION

The embodiments of the present invention disclosed herein have a number of common features, which will initially be described with reference to FIGS. 1 to 6. Throughout the description similar reference numerals are used for similar features.

Figure 1:
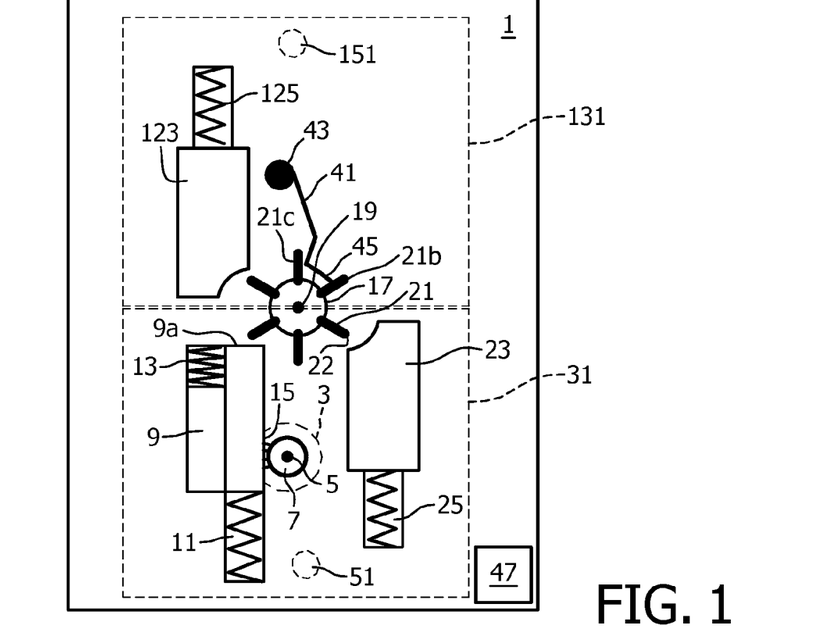
FIG. 1 shows a first embodiment of a switch according to the present invention in a rest position.
Figure 2:
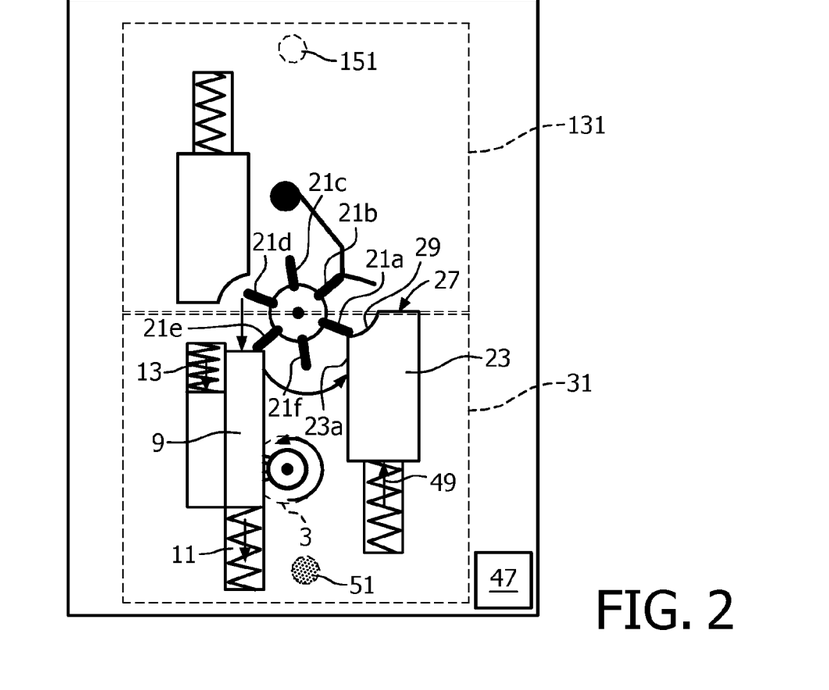
FIG. 2 shows the switch of FIG. 1 in a first position during activation.

FIGS. 1 to 4 show the same switch in different positions. The switch comprises a base 1 supporting the elements of the switch. Thus a generator 3 having a rotatable shaft 5 carrying a gear wheel 7 of which only a section is toothed is mounted to have its shaft 5 extending perpendicular to the plane of the base 1 and the drawing. A generator activating member 9 in the shape of an elongate block with an end face 9a is mounted next to the gear wheel 7 to be slidable through a defined path between a rest position (FIGS. 1 and 4) and loaded position (FIG. 2). Two springs 11 and 13 force the generator activating member 9 against the rest position. Using two springs is preferred for stability reasons as the provision of two springs assists guiding the generator activating member. However in accordance with the invention it is possible to use only one spring, cf. e.g. the embodiment shown in FIGS. 7 to 9. In the present embodiments the defined path is rectilinear and the side of the generator activating member 9 facing the gear wheel 7 is provided with a likewise rectilinear rack portion 15 comprising teeth (not shown in detail in FIGS. 1 to 4) engaging the teeth of the gear wheel 7 whereby the rack portion 15 and the gear wheel 7 provide a generator coupling.

A protrusion member in the shape of a toothed wheel 17 is mounted to be rotatable around an axis 19. The toothed wheel 17 carries a number, six in the present embodiments, of protrusions in the shape of teeth 21, which in the present embodiments have a multiple function as will be explained below. When the toothed wheel 17 rotates around its axis 19 the tips 22 of the teeth 21 describe a circular protrusion's path.

Figure 3:
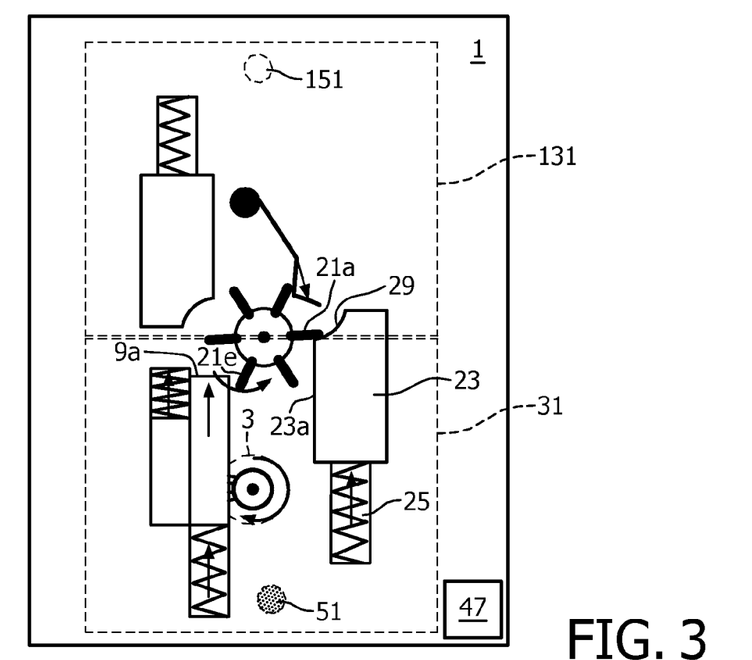
FIG. 3 shows the switch of FIG. 1 in a second position during activation.

A sliding member 23 is mounted to be slidable through a slide path between a first position (FIG. 1) and a second position (FIG. 3). A spring 25 forces the sliding member 23 towards the first position. A first surface part or end face 27 of the sliding member 23 is provided with a chamfer or a recess 29, to optimize the engaging and the releasing of the protrusion member.

Figure 5:
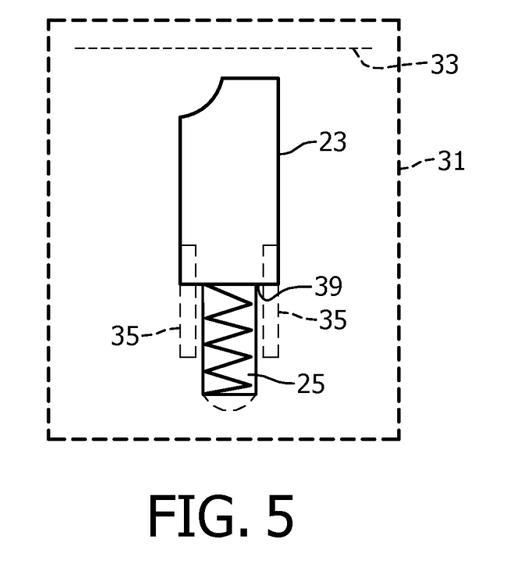
FIG. 5 illustrates a force transferring mechanism of the switch.
Figure 6:
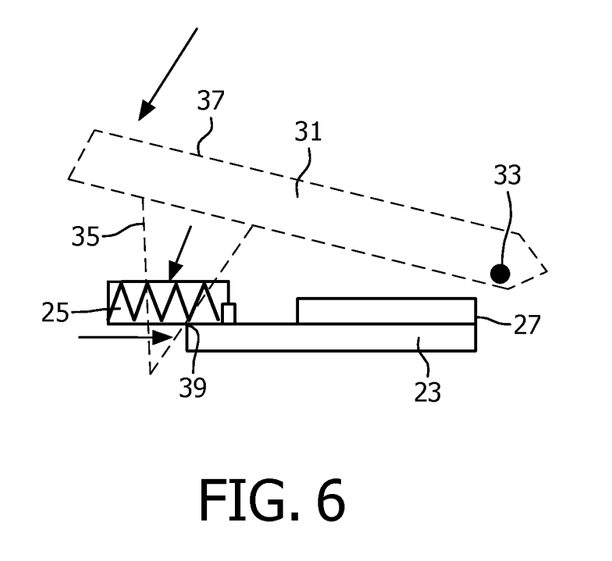
FIG. 6 is a side view of the mechanism in FIG. 5.

Above the base a manual actuator member 31, which in the present embodiments is constituted by a push-button, is provided as indicated in broken lines. FIGS. 5 and 6 illustrate in more detail how the manual actuator member 31 works. Thus the manual actuator member is hinged on an axis 33 and carries two wedge-shaped protrusions 35 below its upper surface 37, which in use will face the user. The two wedge shaped protrusions 35 are placed on either side of the spring 25 forcing the sliding member 23 towards the first position, and when the manual actuator member 31 is depressed by a user in a direction generally perpendicular to the plane of the base and thus the direction of the slide path the wedge shaped protrusions 35 will engage a rear edge 39 of the sliding member 23 opposite the end face 27 and force the sliding member 23 towards the second position. On the user's release of the manual actuator member 31 the spring 25 will force back the sliding member 23 to the first position and the engagement between the rear edge 39 and the wedge shaped protrusions 35 will force the manual actuator member 31 back into the initial rest position shown in FIG. 6. Thus the wedge shaped protrusions 35 and the rear edge 39 provide a transmission between the manual actuator member 31 and the sliding member 25 transferring force and movement.

A bias component 41 for biasing the protrusion member or toothed wheel 17 towards a rest position is provided by a spring filament on a mount 43. The end of the spring filament opposite the mount 43 is shaped as an engagement part 45 for engaging the teeth of the toothed wheel 17 and especially for resting between neighboring teeth of the teethed wheel 17.

Electronics 47 are provided for creating or providing control signals and emitting the same when supplied by power from the generator 3. The electronics 47 may comprise components such as: a microcontroller for providing or creating control signals, a communication unit, e.g. a wireless communication interface (e.g. a radio, an infrared transmitter) or a wired communication interface, for emitting the control signals, a memory for storing information required by the microcontroller for creating relevant control signals, e.g. identification of the switch, and further components such as may be needed for specific modes of operating the switch to provide required control, e.g. a timer. The electronics may further comprise a conversion member to adapt the energy provided by the generator, and energy storage to temporarily store the energy provided by the generator.

A possible subject of control by means of the switch according to the invention is lighting when the possibility of switching the light on and off is requested together with a possibility of dimming the light. Further exemplary applications include controlling shades/shutters, doors, windows, etc.

As described so far the switch works as follows:

FIG. 1 shows the switch in an initial rest position prior to activation by a user, the generator activating member 9 being in its rest position, the toothed wheel 17 being also in a rest position and the sliding member 23 being in its first position. When a user activates the switch by moving the manual actuator member to an actuated position i.e. in the present embodiment by depressing the manual actuator member 31, the sliding member 23 will move towards its second position as indicated by arrow 49 in FIG. 2. The first surface part or end face 27 of the sliding member 23 will engage the tip 22 of a first protrusion or first tooth 21a and continued forward movement of the sliding member 23 will result in a counterclockwise rotation of the toothed wheel 17. The engagement part 45 of the bias component 41 will be forced out of the space between neighboring teeth 21b and 21c in which it was resting and be moved counterclockwise around the mount 43 against the spring force of the spring filament of the bias component 41. The tip of a tooth 21e will engage the end face 9a of the generator activating member 9 in a first position of the tooth 21e and by the continued movement through the protrusion's path the tooth 21e will force the generator activating member 9 through the defined path towards its loaded position against the force of the springs 11 and 13, which thus accumulate energy. During this movement of the generator activating member 9 towards the loaded position the generator 3 is rotated relatively slowly in a counterclockwise direction.

When the manual actuator member 31 has reached its depressed position and accordingly the sliding member 23 has reached its second position indicated in FIG. 3, or shortly before, the tooth 21e passes a second position thereof i.e. a point in its path where it leaves the end face 9a and releases the generator activating member 9, which at this point is in maximum loaded position. Accordingly the generator activating member 9 is swiftly moved back to its rest position by the force of the springs 11 and 13 thereby rotating the generator 3 relatively fast in clockwise direction to thereby provide power for the electronics 47.

At this point the engagement part 45 of the bias component has passed the tooth 21b and seeks to enter the space between the tooth 21b and the tooth 21a thereby biasing the toothed wheel 17 to turn further in the counterclockwise direction. However a second surface part or side 23a of the sliding member 23 next to the recess 29 blocks the protrusion's path for a trailing protrusion or trailing tooth 21f trailing the first tooth 21a and prevents the toothed wheel 17 from reaching a rest position similar to the position shown in FIG. 1 but with all of the teeth 21 shifted one position in the counterclockwise direction.

Figure 4:
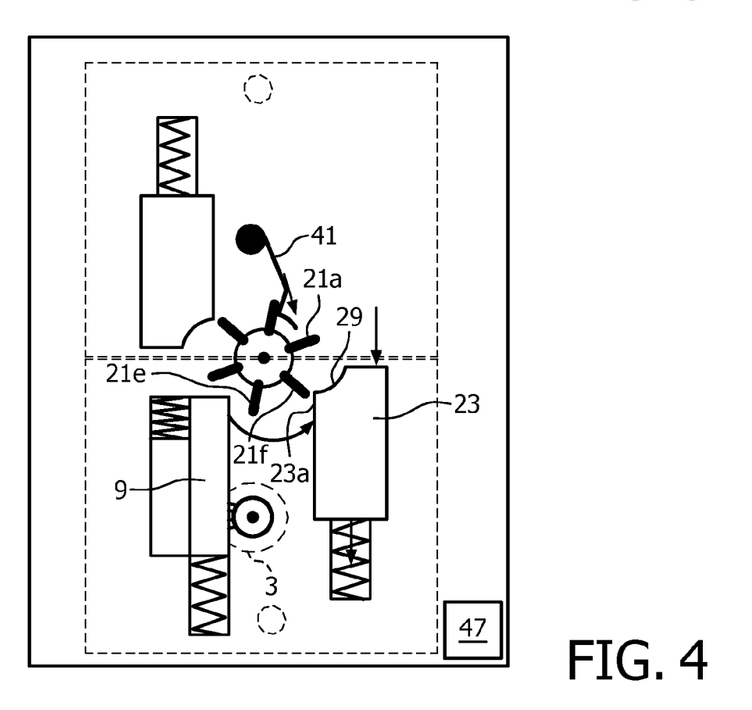
FIG. 4 shows the switch of FIG. 1 in a position during release.

This is the situation shown in FIG. 4, which shows the switch during reverse movement of the sliding member 23 after the user has released the manual actuator member 31 from its depressed position.

Shortly after the sliding member 23 moves further down, such that the trailing tooth 21f can enter the chamfer/recess of the sliding member 23 and the toothed wheel 17 is free to rotate further counterclockwise, and the toothed wheel does rotate further due to the bias of the bias component 41 into its rest position as shown in FIG. 1, but with all teeth 21 shifted one position, as mentioned above, and the sliding member 23 reaches its first position indicated in FIG. 1.

It is understood that this procedure will allow the generator to harvest the energy and the electronics 47 to provide and emit a control signal, but as described so far the switch only allows for one kind of signal.

According to the preferred embodiments of the invention a step motor is used as the generator 3. The generator 3 is driven or rotated in one direction when the generator activating member 9 is moved from its rest position to its loaded position and it is rotated in the opposite direction when the generator activating member 9 is moved from its loaded position to its rest position. However the energy that might be produced by the former movement of the generator activating member 9 is generated directly in accordance with the user's action and thus it is not as predictable as and generally lower than the energy generated by the action of the springs 11 and 13 acting on the generator activating member 9. Therefore according to the preferred embodiments of the invention only the energy produced through the generator 3 by the single movement of the generator activating member 9 from its loaded position to its rest position triggers emission of a control signal. The skilled person will easily realize ways of discriminating between energy produced by the two opposite directed rotations of the generator 3.

According to the invention the switch comprises a provider for at least one different control signal and different providers, i.e. different embodiments providing for at least two different control signals, will be described in the following with reference to different embodiments of the invention.

The embodiment shown in FIGS. 1 to 4 comprises a second manual actuator member constituted by a second manual actuator member 131, a second sliding member 123 with a second spring 125 forcing the second sliding member 123 towards a first position shown in all of FIGS. 1 to 4. The second sliding member 123 is slidable from its first position to a second position through a slide path and the arrangement of the second slide member 123 is quite similar the arrangement of the first slide member 23 only is it mirror inverted or rotated through 180° around the axis 19 of the toothed wheel 17. Thus the function of the second manual actuator member is similar to the function of the first manual actuator member as described above.

A micro switch 51 is attached to the first manual actuator member 31 and another micro switch 151 is attached to the second manual actuator member 131. The micro switches 51 and 151 will be activated when the respective manual actuator member 13 or 131 is depressed and accordingly the electronics 47 will register the activation of the respective micro switch(es) and the electronics 47 will provide different control signals depending on whether the first, the second or both manual actuator members are depressed by the user. Thus the second manual actuator member 131 with its accompanying slider member 123 provides a provider for at least one different control signal.

In a variant of this embodiment one of the micro switches may be removed. In such case the electronics will provide one control signal if the present micro switch is not activated and a different control signal if the micro switch is activated when energy is produced by the generator 3.

An exemplary manner of operation of the switch of the first embodiment comprising two manual actuator members 31 and 131 together with two micro switches 51 and 151 could be:

press both manual actuator members: emit control signal to toggle the light (on/off), press one manual actuator member: emit control signal to dim down the light until the second manual actuator member is pressed, press the other manual actuator member: emit control signal to dim up the light until the first manual actuator member is pressed.

Another exemplary manner of operation of the switch of the first embodiment comprising two manual actuator members 31 and 131 together with two micro switches 51 and 151 could be:

press one manual actuator member: emit control signal to turn on the light, press the other manual actuator member: emit control signal to turn off the light, press both manual actuator members: emit control signal to trigger a special action (e.g. a commissioning action).

The control signals emitted by a switch according to the present invention will in practical use be received by a receiver attached to a receiving device that should be controlled by a user by means of the switch.

It should be noted that in a specific case the receiver or receiving device may be programmed to react in a given way in response to control signals or sequences of control signals received from the energy harvesting switch.

The skilled person will easily envisage other possible manners of operation as well as manners of operating the switch in case of only one micro switch being present.

FIGS. 7, 8, 9 and 9a show a second embodiment of the present invention comprising a release detector for the push-button or manual actuator member 31. The manual actuator member per se is not shown in FIGS. 7 to 9, but the sliding member 23 is shown and the transmission between the manual actuator member and the sliding member 23 is similar to the transmission of the first embodiment.

It should be understood that the second embodiment as regards the features described and discussed above before the mentioning of the second manual actuator member generally is similar to the first embodiment apart from the following differences relating to the bias component and the generator activating member.

Figure 7:
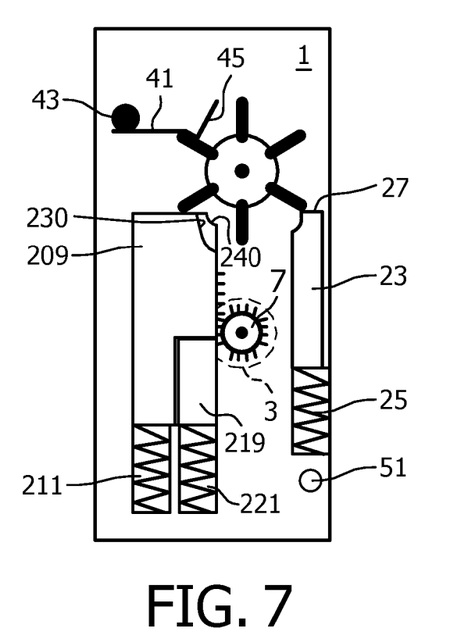
FIG. 7 shows a second embodiment of a switch according to the present invention in a rest position.
Figure 8:
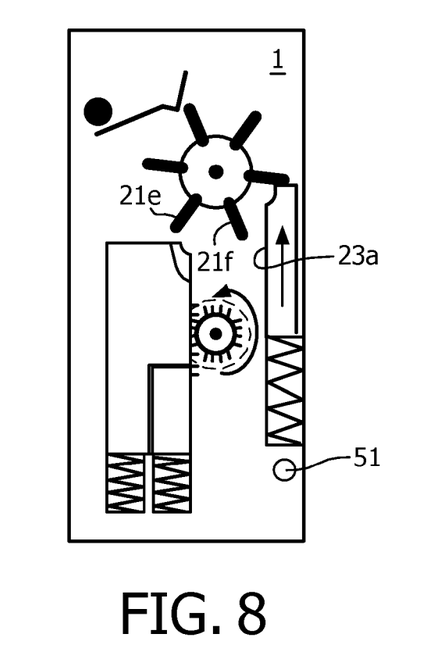
FIG. 8 shows the switch of FIG. 7 in a first position during activation.
Figure 9:
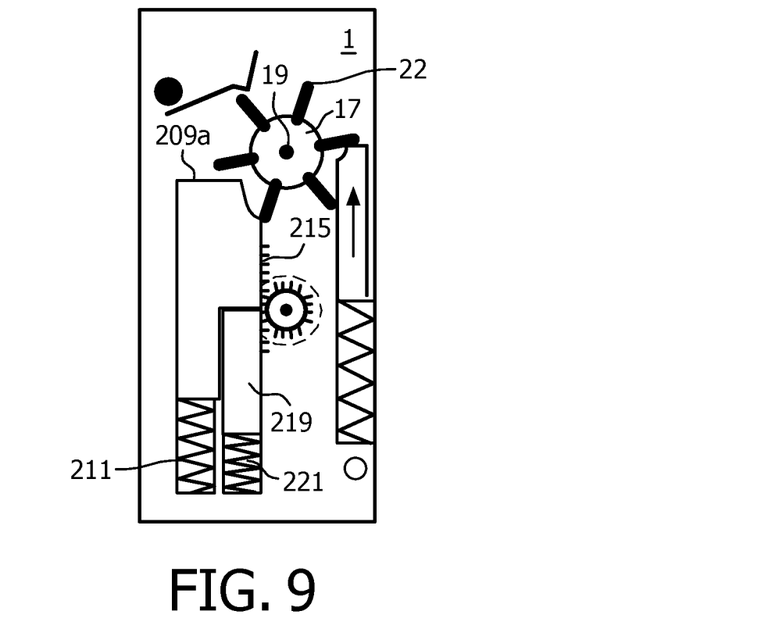
FIG. 9 shows the switch of FIG. 7 in a second position during activation.

The bias component 41 and its mount 43 as depicted in FIGS. 7 to 9 are in a place which was not convenient for the first embodiment due to the presence of the second manual actuator member 131. Thus the engagement part 45 rests in a neighboring space between neighboring teeth compared to the first embodiment, but the function of the bias component is similar and the rest position of the toothed wheel 17 is similar to that of the first embodiment.

In the second embodiment shown in FIGS. 7 to 9 the switch comprises two generator activating members, namely a first generator activating member 209 and an adjacent, or subjacent as seen in FIGS. 7 to 9, second generator activating member 219. The subjacent second generator activating member 219 is seen more clearly in FIG. 9a, which is similar to FIG. 9 in relation to the position of the different elements, but in which the first generator activating member 209 and its spring 211 have been removed for sake of clarity. Either generator activating member 209 and 219 are movable between respective rest positions (FIG. 7) and loaded positions (FIG. 8) along rectilinear and parallel defined paths. The first generator activating member 209 is forced by a spring 211 towards its rest position, the first rest position, and the second generator activating member 219 is forced by a second spring 221 towards its rest position, the second rest position. It should be understood that although only one spring is shown attached to either generator activating member 209 and 219, partly for the sake of simplicity and clarity of the drawing, two springs might be attached to either generator activating member as in the embodiment shown in FIGS. 1 to 4 to assist guiding the respective generator activating members. The first generator activating member 209 is provided with a rectilinear rack portion 215 for engagement with the gear wheel 7 of the generator and the second generator activating member is provided with a likewise rectilinear rack portion 225 for engagement with the gear wheel 7. The rack portion 225 thus constitutes a generator coupling part. The longitudinal extend of the respective racks is such that they allow for engaging/disengaging the gear wheel 7 of the generator 3 at different times, thus harvesting the energy independently as it will be explained below. It should be noted that the gear wheel 7 has a sufficient height in the longitudinal direction of the shaft 5 to engage with the two rack portions 215 and 225 simultaneously.

Opposite to the springs 211 and 221 the two generator activating members 209 and 219 have end faces 209a and 219a, respectively. The end face 209a has a relatively large recess 230 adjacent the side of the generator activating member 209 provided with the rack portion 215, and the end face 219a has a relatively small recess 240 adjacent the side of the generator activating member 219 provided with the rack portion 225. The actual shape of the recess 230 and 240 is shaped such that it best supports the engaging/disengaging of the teeth of the toothed wheel 17.

Figure 10:
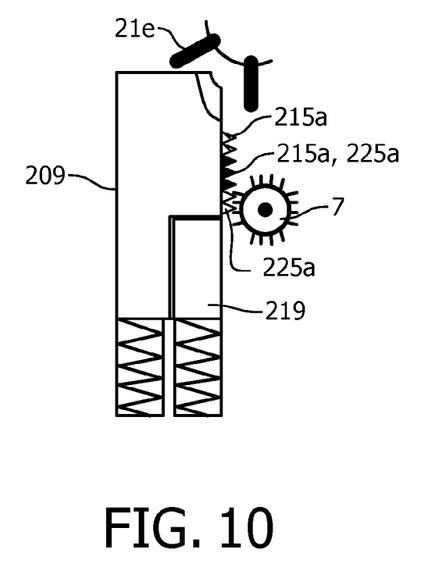
FIG. 10 is an enlarged section of FIG. 7.
Figure 11:
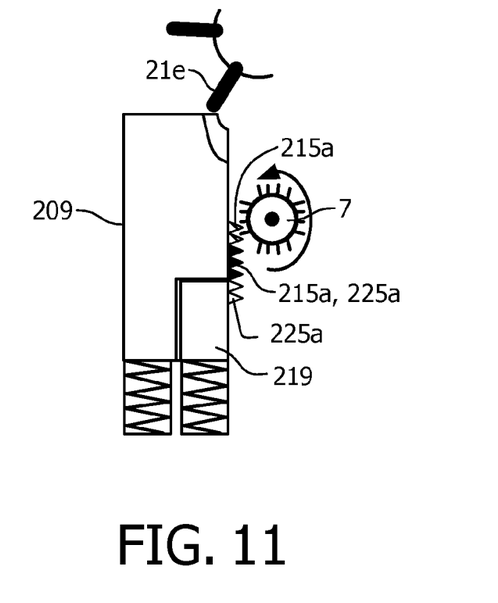
FIG. 11 is an enlarged section of FIG. 8.
Figure 12:
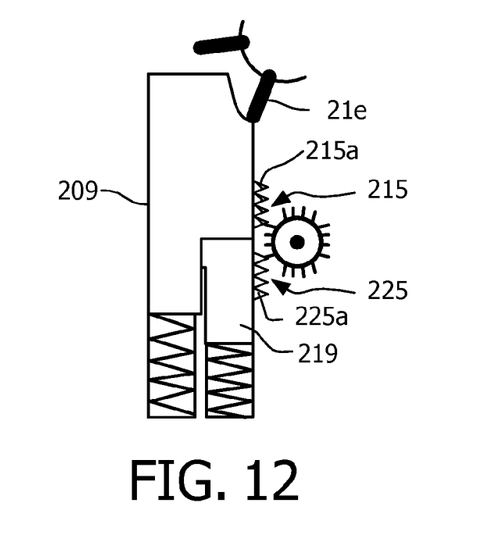
FIG. 12 is an enlarged section of FIG. 9.

FIGS. 10 to 12 show respective enlarged sections of FIGS. 7 to 9 where, for sake of clarity, the gear wheel 7 has been moved slightly away from the generator activating members 209 and 219 thereby showing more clearly the positions of the teeth of the respective rack portions 215 and 225. In FIGS. 10 to 12 the rack portion 215 is show to comprise teeth 215a symbolized by hatched triangles and the rack portion 225 is shown to comprise teeth 225a symbolized by blank triangles. Black triangles are symbolizing aligned teeth 215a and 225a of the two rack portions 215 and 225.

The switch of this second embodiment with release detection works as follows:

When the manual actuator member or the push-button is activated by a user to be moved to an actuated position i.e. when in the present embodiment it is depressed and the sliding member 23 is moved from the rest position shown in FIG. 7 towards its second position the protrusion member or toothed wheel 17 rotates due to the contact between the first surface part or end face 27 of the sliding member 23 and the first protrusion or first tooth 21a and the protrusion or tooth 21e engages the end faces 209a and 219a exactly as explained above with reference to FIGS. 1 to 6.

It should however be noted that in this second embodiment the rack portion 215 is out of engagement with the gear wheel 7 when the generator activating member 201 is in its rest position, as shown in FIG. 10.

When the tooth 21e has engaged the end faces 209a and 219a, which takes place simultaneously, the generator activating members 209 and 219 starts a common movement through their defined paths towards their respective loaded positions i.e. first loaded positions for the generator activating member 209 and second loaded positions for the second generator activating member 219. Shortly after initiation of the common movement of the generator activating members 209 and 219, the rack portion 215 engage with the gear wheel 7 the rack portion 225 being already engaged with gear wheel 7 and the continued movement of the generator activating members 209 and 219 entails a relatively slow counterclockwise movement of the gear wheel 7 and the generator 3.

As seen in FIG. 8 the generator activating members 209 and 219 are moved to their loaded positions with the springs

211 and 221 compressed and energy being accumulated therein. At this point the tip of the tooth 21e is at the edge of the end face 209a of the first generator activating member adjacent to the recess 230. The manual actuator member is about 90% depressed at this point. Continued depression of the manual actuator member results in the tooth 21e leaving the end face 209a and entering the recess 230 the toothed wheel 17 entering a first disengagement position whereby the first generator activating member 209 is released and accordingly is swiftly moved back to its rest position by the force of the spring 211 thereby rotating the generator 3 relatively fast in clockwise direction to thereby provide power for the electronics 47.

Thereby the position shown in FIG. 9 is reached corresponding to 100% depression of the manual actuator member. It should be noted that during the final movement towards the second loaded position of the second generator activating member 219 shown in FIGS. 9 and 12 the rack portion 225 thereof is moved out of engagement with the gear wheel 7. Thus the rack portion 225 does not block the movement of the gear wheel 7 and the generator 3 when the second generator activating member 219 is in its loaded position of FIGS. 9 and 12.

Like in the case of the first embodiment the second surface part or side 23a of the sliding member 23 blocks the protrusion's path for the trailing tooth 21f when the sliding member 23 is in the position forwarded by the depressed manual actuator member. Therefore the tooth 21e is not able to leave the recess 240 of the second generator activating member 219, and the second generator activating member 219 is not released to return to its rest position at this point.

Figure 9A:
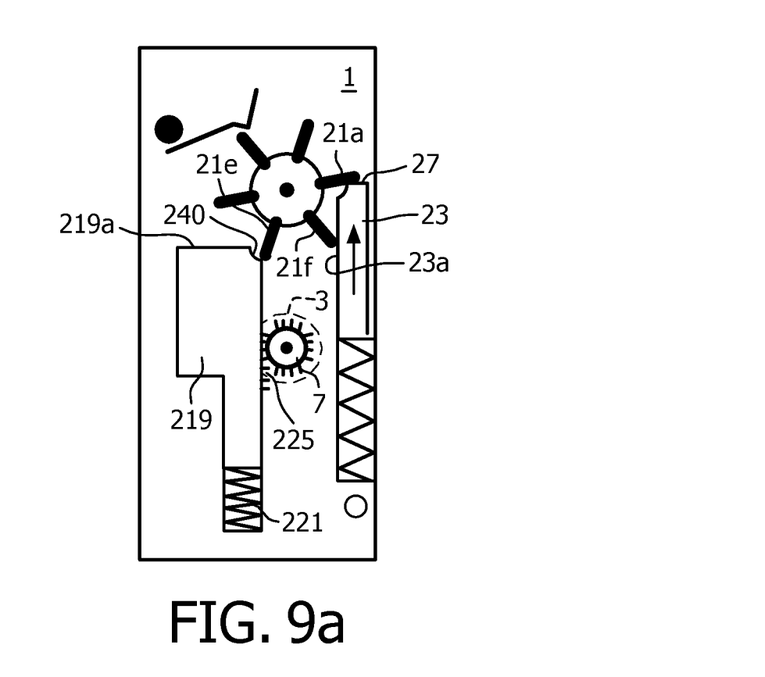
FIG. 9a is a view similar to FIG. 9, but with elements removed for clarity.

It is noted that the shape and size of the recess 240 entails that the second generator activating member 219 in its position shown in FIGS. 9 and 9a assumes a position corresponding to the position assumed by the first generator activating member 209 immediately prior to release as seen in FIG. 8 at a similar distance from the rest position.

When the manual actuator member 31 is released and the sliding member 23 is allowed to return to its first position due to the force of the spring 25 the trailing tooth 21f is allowed to pass the sliding member 23 in the same manner as explained above with reference to the first embodiment and due to the bias of the spring component the toothed wheel 7 will rotate into its rest position as shown in FIG. 7 the tooth 21e leaving the recess 240 to release the second generator activating member which accordingly is swiftly moved back to its rest position by the force of the spring 221 thereby rotating the generator relatively fast in clockwise direction thereby providing power for the electronics 47. At this point the rack portion 215 of the first generator activating member is out of engagement with the gear wheel 7 as explained above, and thus the rack portion 215 does not block the movement of the gear wheel 7 and the generator 3 while the second generator activating member 219 is returned to its rest position.

A possible manner of operation of the switch of the second embodiment comprising a single manual actuator member 31 with detection of release as well as depression could be:
Manual actuator member depressing: Harvest energy and:
check internal Button variable (a memory), and set to ON if check shows "off";
wake the microcontroller;
start the timer;
If manual actuator member release is detected before timeout:
set internal Button variable to OFF;
activate the communication unit;
emit Toggle (on/off) command;
Else If timeout:
activate the communication unit;
emit a Move command (to dim the light);
deactivate the microcontroller and switch off the communication unit;
Manual actuator member release: harvest energy and
check internal Button variable, and set to OFF if check shows "on";
activate the communication unit;
emit Stop command.

In a variant the second embodiment comprises the micro switch 51 attached to the manual actuator member. Thus the micro switch 51 will be activated at the time when the generator 3 is driven by the first generator activating member 209, and it will not be activated at the time when the generator 3 is driven by the second generator activating member 219. Thereby discrimination between depressing and releasing the manual actuator member is provided for, and the release detection provides for different control signals depending on the manual actuator member being depressed or released.

A possible manner of operation of the switch of the variant of the second embodiment comprising a single manual actuator member 31 with detection of release as well as depression could be:
Manual actuator member depressing: Harvest energy and:
check status of micro switch, if ON;
wake the microcontroller;
start the timer;
If manual actuator member release is detected before timeout (micro switch OFF):
activate the communication unit;
emit Toggle (on/off) command;
Else If timeout:
activate the communication unit;
emit a Move command (to dim the light);
optionally deactivate the microcontroller and switch off the communication unit;
Manual actuator member release: harvest energy and check status of micro switch, if OFF;
activate communication unit;
emit Stop command.

The skilled person will realize other means of discriminating between depression and release of the manual actuator member. One method is to differentiate the amount of harvested energy, influenced by the design details of the generator activating members 209 and 219, especially the strength of the springs 211 and 221, and the number of teeth on the rack parts 215 and 225.

In another variant of the second embodiment, the elements of the first and the second embodiment are combined. The energy supplying set as described in the second embodiment and depicted in FIGS. 7 to 9, comprising the generator activating members 209 and 219, with the springs 211 and 221, the rack parts 215 and 225, the recesses 230 and 240, the gear wheel 7, the shaft 5, the generator 3, and the toothed wheel 17, can be triggered by two manual actuator members 31 and 131 as described in the first embodiment and depicted in FIGS. 1 to 4, with the sliding member 23 and 123 and spring 25 and 125 per manual actuator member.

A possible manner of operation of such switch according to combined first and second embodiment comprising two manual actuator members 31 and 131, both with detection of depression as well as release could be:

Manual actuator member 31 depressing: Harvest energy and:
wake the microcontroller;
start the timer;
If releasing of manual actuator member 31 is detected before timeout:
activate the communication unit;
emit On command;
Else If timeout:
activate the communication unit;
emit a Move up command (to dim up the light);
optionally deactivate the microcontroller and switch off the communication unit;
Manual actuator member 31 releasing: harvest energy and activate the communication unit;
emit Stop command.
Manual actuator member 131 depressing: Harvest energy and:
wake the microcontroller;
start the timer;
If manual actuator member release is detected before timeout:
activate the communication unit;
send Off command;
Else If timeout:
activate the communication unit;
send a Move down command (to dim down the light);
optionally deactivate the microcontroller and switch off the communication unit;
Manual actuator member 131 releasing: harvest energy and activate the communication unit;
send Stop command.
Depressing of both manual actuator members 31 and 131: special action (e.g. commissioning action).

Another possible manner of operation of the switch according to combined first and second embodiment comprising two manual actuator members 31 and 131, both with detection of release as well as depression could be:

Manual actuator member 31 depressing: Harvest energy and:
wake the microcontroller; activate the communication unit; emit On command.
Manual actuator member 31 releasing: Harvest energy and wake the microcontroller; activate the communication unit; emit Stop command.
Manual actuator member 131 depressing: Harvest energy and:
wake the microcontroller; activate the communication unit; emit Off command;
Manual actuator member 131 releasing: Harvest energy and:
wake the microcontroller; activate the communication unit; emit Stop command;
Depressing of both manual actuator members 31 and 131: special action (e.g. commissioning action).

The receiver or receiving device can determine the control action (on/off versus dim up/down), based on the sequence of the control signals and their respective timing.

Figure 13:
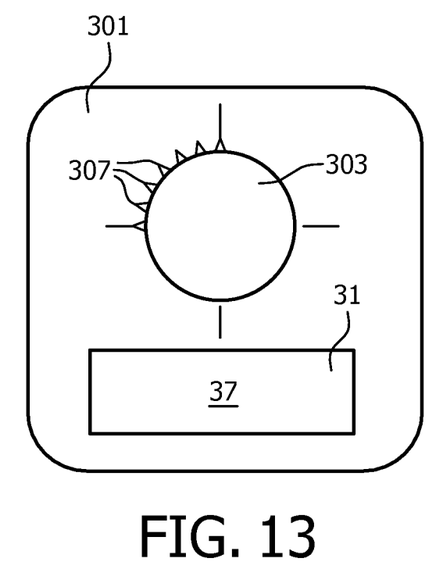
FIG. 13 shows a third embodiment of a switch according to the present invention.
Figure 14:
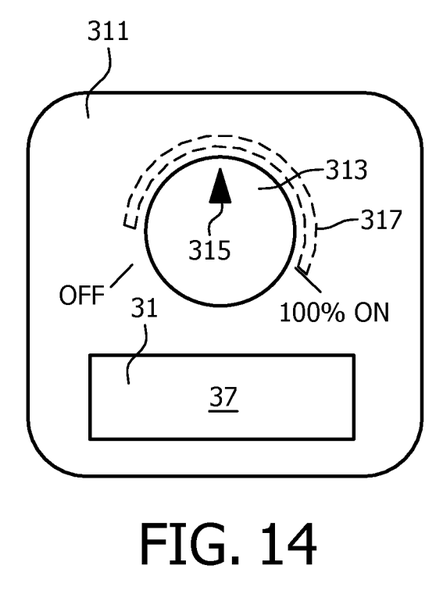
FIG. 14 shows a variant of the switch of FIG. 13.

FIG. 13 shows a third embodiment of the invention and FIG. 14 shows a variant thereof. FIGS. 13 and 14 do not show the mechanics of the switch like FIGS. 1 to 4 and 7 to 9 do, but in a simple version the energy harvesting part of the switch from manual actuator member to the electronics may be similar to what is described initially as common features of the first and second embodiments. Thus FIGS. 13 and 14 both show the upper surface 37 of the manual actuator member 31. As a provider for at least one different control signal both variants of FIGS. 13 and 14 comprise a manually movable control member and a sensor configured to sense the position of said control member.

Thus FIG. 13 shows a housing 301 of the switch with the push-button or manual actuator member 31 and a manually movable control member in the shape of a rotatable knob 303. The knob 303 is endlessly and stepwise rotatable, with the number of steps N, both clockwise and counterclockwise. In the present embodiment N=24 steps are provided for per 360° revolution by a means of example. For each step a micro switch 307 is provided of which only seven are shown. Each micro switch 307 provides for identification when a counterpart attached to the knob 303 is present. In this variant the electronics 47 should comprise a memory storing the position of the knob 303 when the manual actuator member 31 is depressed and the switch is activated. Next time the manual actuator member is depressed and the switch is activated, the present position of the knob 303 is registered by the electronics and the position is compared to the latest stored position. Based on the comparison the electronics provide a control signal. Thus the knob 303 and the micro switches 307 registering its position provide for different control signals.

The control signals may e.g. be provided as follows in dependence on the users repositioning of the knob 303 or lack of position change of the same.

Manual actuator member depression: the energy is harvested, the knob position $P_i$ is read out, compared with previous position (stored) $P_{i-1}$—by calculating (M= $(P_i-P_{i-1})$) mod N, where "a mod N" is the remainder of dividing a by N; so for example 10 mod 10=0, 4 mod 10=4, and −3 mod 10=7—and communication unit is activated to:
  if no level change (M=0): emit Toggle command,
  if rotation of up to and including 180° to the right is detected
  ($1 \leq M \leq [N/2]$): step up (M*(100%/[N/2]))
  if rotation of up to 180° to the left is detected
  ($[N/2]+1 \leq M \leq N-1$): step down ((N-M)*(100%/[N/2]))

FIG. 14 shows a similar housing 311 of the switch with the push-button or manual actuator member 31 and a manually movable control member in the shape of a rotatable knob 313. In this case however the knob 313 is rotatable between stops as indicated by end marks, by means of example "100% ON" and "OFF" on the face of the housing next to the knob 313. The knob 313 is provided with a reference mark 315. In this case a potentiometer 317 provides for registration of the position of the knob 313. In this variant the electronics may simply provide a control signal in dependence on the absolute position of the knob 313. In a further variant the rotatable knob 313 might be substituted by a sliding knob provided for sliding movement between two stops and constituting the manually movable control member.

The person skilled in the art realizes that the present invention by no means is limited to the preferred embodiments described above. On the contrary, many modifications and variations are possible within the scope of the appended claims, some of which are indicated above.

Especially it should be noted that the three embodiments disclosed may be used per se or the special features of any two or all three embodiments may be used together. Thus it is e.g. possible to provide a switch with two manual actuator members and detection of manual actuator member release. Further e.g. such switch may be provided with a manually movable control member.

The invention claimed is:

1. An electro-mechanical energy harvesting switch configured to provide at least two different control signals, said switch comprising:
a generator activating member configured to move between a rest position and a maximum loaded position; and
at least one spring configured to force the generator activating member towards the rest position and comprising a unidirectionally rotating protrusion member comprising at least one protrusion configured to move through a protrusion's path during rotation of the protrusion member through a first position of the protrusion, in which first position the protrusion is engaged with the generator activating member in the rest position, and through a second position, the protrusion thereby carrying the generator activating member from the rest position to the maximum loaded position against the force of said at least one spring.

2. The electro-mechanical energy harvesting switch according to claim 1, wherein the protrusion member is a toothed wheel carrying evenly spaced teeth constituting a plurality of said protrusions.

3. The electro-mechanical energy harvesting switch according to claim 1, comprising a bias component biasing the protrusion member towards a rest position.

4. The electro-mechanical energy harvesting switch according to claim 1, wherein the generator activating member comprises a rack portion extending along a path followed by the generator activating member and constituting a part of a generator coupling, and a generator is provided with at least a sector of a gear wheel constituting another part of the generator coupling.

5. The electro-mechanical energy harvesting switch according to claim 1, further comprising a sliding member configured move through a slide path between a first and a second position on the slide path, and comprising a transmission between the sliding member and a manual actuator member, the sliding member moving upon activation of the manual actuator member thereby engaging with and moving the protrusion member to forward the protrusion through the protrusion's path.

6. The electro-mechanical energy harvesting switch according to claim 5, wherein the manual actuator member is configured to move upon manual activation by a user in a direction crosswise to the slide path and the transmission provided between the manual actuator member and the sliding member is transferring a movement of the manual actuator member into a movement of the sliding member along the slide path.

7. An electro-mechanical energy harvesting switch according to claim 5, further comprising a release detector for a manual actuator member.

8. An electro-mechanical energy harvesting switch according to claim 7, wherein the release detector comprises:
a second generator activating member configured to move between a second rest position and a second loaded position; and
at least one second spring configured to force the second generator activating member towards the second rest position;
wherein the two generator activating members are configured to be engaged simultaneously by the protrusion member, the first generator activating member is configured to be disengaged from the protrusion member in a first disengagement position of the protrusion member to be released for return movement towards the rest position, the protrusion member being movable into the first disengagement position by action of the manual actuator member being moved to an actuated position and the second generator activating member being releasable for return movement towards the second rest position on release of the manual activator member from the actuated position.

9. An electro-mechanical energy harvesting switch according to claim 8, wherein the second generator activating member is configured to be disengaged from the protrusion member in a subsequent position of the protrusion member subsequent to the first disengagement position of the protrusion member and reachable by the protrusion member when the manual actuator member is released from the actuated position.

10. An electro-mechanical energy harvesting switch according to claim 9, wherein the protrusion member comprises a plurality of protrusions and the sliding member comprises a first surface part configured to engage a first protrusion for moving the protrusion member in its rotational direction and a second surface part configured to block the protrusions path for a trailing protrusion trailing the first protrusion, when the sliding member is in the second position on the slide path, thereby blocking the entry of the protrusion member into the subsequent position.

11. The electro-mechanical energy harvesting switch according to claim 1, comprising a manually movable control member and a sensor configured to sense the position of said control member.

12. The electro-mechanical energy harvesting switch according to claim 11, wherein the control member comprises an endlessly rotatable knob.

13. The electro-mechanical energy harvesting switch according to claim 11, wherein the control member comprises a knob movable between two stops.

14. The electro-mechanical energy harvesting switch according to claim 1, comprising a first and a second manual actuation member and at least one sensor configured to sense activation of at least one of the first and the second manual actuator member.

15. The electro-mechanical energy harvesting switch according to claim 14, further comprising a second sliding member configured to move through a second slide path between a first and a second position, upon activation of the second manual actuator member, thereby engaging with and moving the protrusion member to forward the protrusion through the protrusion's path.

* * * * *